US006003839A

United States Patent [19]

Kobayashi

[11] Patent Number: 6,003,839

[45] Date of Patent: Dec. 21, 1999

[54] ELECTROMAGNETIC VALVE AND METHOD FOR MANUFACTURING THE SAME

[75] Inventor: Nobuaki Kobayashi, Gunma, Japan

[73] Assignee: Unisia Jecs Corporation, Atsugi, Japan

[21] Appl. No.: 09/146,748

[22] Filed: Sep. 4, 1998

[30] Foreign Application Priority Data

Sep. 5, 1997 [JP] Japan .................................... 9-257765

[51] Int. Cl.[6] .................................................... F16K 37/00

[52] U.S. Cl. ....................................... 251/129.15; 335/281

[58] Field of Search ........................ 251/129.15; 335/281, 335/297

[56] References Cited

U.S. PATENT DOCUMENTS

| | | | |
|---|---|---|---|
| 5,236,012 | 8/1993 | Lin | 137/554 |
| 5,503,366 | 4/1996 | Zabeck et al. | 251/129.18 |
| 5,577,322 | 11/1996 | Ohshita et al. | 29/890.13 |
| 5,767,395 | 6/1998 | Goto et al. | 73/118.1 |
| 5,820,099 | 10/1998 | Rahbar et al. | 251/129.15 |

*Primary Examiner*—Steven O. Douglas
*Attorney, Agent, or Firm*—Foley & Lardner

[57] ABSTRACT

In an electromagnetic valve applicable to an evaporated fuel purge system of a vehicular internal combustion engine and a method for manufacturing the same, a magnetic core member is caulked to a housing at an accurate position thereof under a spinning process. The core member includes: a relatively large diameter portion; a relatively small diameter portion; and a whole peripherally caulked portion. With the relatively large diameter portion inserted into a core member inserting hole of a valve casing, the relatively small diameter portion is inserted into a core member attaching hole of the housing. The whole peripherally caulked portion is formed in an approximately truncated cone shape using a roll of a spinning process device.

11 Claims, 4 Drawing Sheets

ELECTROMAGNETIC VALVE AND METHOD FOR MANUFACTURING THE SAME

BACKGROUND OF THE INVENTION a) Field of the Invention

The present invention relates to an electromagnetic valve having a magnetic core member secured to a housing and a method for manufacturing the same. The electromagnetic valve is suitably applicable to a vehicular internal combustion engine for controlling a fuel supply quantity or controlling a purge quantity of an evaporated fuel into an intake air system of the engine.

b) Description of the Related Art

In general, for example, a purge system of an evaporated fuel has been adopted in a vehicular internal combustion engine in which a fuel gas evaporated in a fuel tank (so-called, an evaporated gas) is temporarily reserved into a canister and the evaporated gas is introduced into an intake air passage to burn the evaporated gas with the intake air so that the evaporated gas is prevented from being discharged into the atmosphere external to the engine. In the purge system, a purge passage is installed between the canister and intake air passage for causing the evaporated gas to be circulated into the intake air passage, in a midway through the purge passage an electromagnetic valve such as a purge control valve being installed so as to enable an open or closure of the purge passage according to a drive signal inputted thereto.

A previously proposed structure of the electromagnetic valve such as the purge control valve will be described below.

A valve casing formed in a stepped cylindrical shape includes: a core inserting hole through which a core member as will be described below is inserted; and a valve seat arranged for seating a valve body (which will be described below) thereon, both of the core inserting hole and the valve seat being coaxially and vertically extended in the electromagnetic valve. In addition, inlet and outlet are projected radially from the valve casing, both of the inlet and outlet being mutually communicated or interrupted according to an open and closure of the valve seat. An annular metallic plate made of a magnetic material is buried into an internal (thickness portion) of the valve casing so as to enclose the valve body. A part of the annular metallic plate is projected radially from the valve casing.

An approximately letter-U shaped housing formed of the magnetic material such as the iron member or a magnetic stainless steel material is positioned on an outer periphery of the valve casing and extended in the axial direction of the valve casing.

A core inserting hole at a basic end of the housing is placed on an axis line of the valve casing so as to be coaxial with the core inserting hole of the valve casing. A tip end of the approximately letter-U shaped housing is linked to the annular metallic plate.

A rod-shaped core member made of the magnetic material such as iron or magnetic stainless steel includes: a large diameter portion inserted into a core inserting hole of the valve casing; a small diameter portion located on a basic end of the large diameter portion and inserted into a core member attaching hole of the housing at a position projected from the core inserting hole; and a diameter extended portion formed on a basic end of the small diameter portion.

It is noted that the core member is secured to the core member inserting hole of the housing through the diameter extended portion and is extended along the axial line of the core member attaching hole.

In addition, the core member is attached onto the valve casing together with the housing and its large diameter portion is coaxially extended within the core member inserting hole of the valve casing. A tip end of the large diameter portion is faced against a valve body with a constant clearance to limit a lift distance of the valve body (a valve opening variable of the valve body) at a predetermined magnitude. An electromagnetic coil is located on an outer periphery of the core member inserting hole and is buried into an internal of the valve casing. The electromagnetic coil is energized by an external power supply to form a magnetic field thereabout to open a valve body.

The valve body is made of the magnetic material of an iron system metal and is installed within the valve casing. The valve body is attracted magnetically onto the core member by means of the power supplied electromagnetic coil so as to be separated from a valve seat of the valve casing to open the valve.

When the electromagnetic coil receives the power supply, a closed magnetic path is formed with the coil, plate, housing, the core member, and the valve body is magnetically attracted onto the tip end of the core member (large diameter portion). Hence, the valve body is open and is contracted on the tip end of the core member so as to communicate the inlet with the outlet.

In addition, when the electromagnetic valve is assembled, the electromagnetic coil and the valve body are at first attached onto the valve casing, the core member is fixed onto the housing, and, thereafter, the housing is attached onto the valve casing.

It is noted that when the core member is fixed onto the valve casing, with the large diameter portion of the core member is attached onto a clamp, after the small diameter portion is inserted within the core member attaching hole, a pressurizing jig such as a punch is used to apply the pressure onto the basic end of the small diameter extended portion. Hence, the diameter extended portion is deformed due to a plastic deformation on the small diameter portion. Consequently, the core member cannot be drawn out from the housing by means of the diameter extended portion.

SUMMARY OF THE INVENTION

In the previously proposed electromagnetic valve described in the BACKGROUND OF THE INVENTION, when the core member is secured onto the hollow housing, the small diameter portion of the core member is pressed in the axial direction of the core member so to form the diameter extended portion. However, in order to make a smooth inserting operation for the core member into the core member attaching hole of the housing, an outer diameter dimension of the small diameter portion is slightly smaller than the diameter of the core member attaching hole so that before the formation of the diameter extended portion on the basic end of the small diameter portion, the small diameter portion is relatively moderately inserted into the core member attaching hole.

In addition, when the diameter extended portion is formed, a mere single pressure application operation causes the small diameter portion to be pressed in the axial direction so that the housing is tended to be displaced with a tilt of the housing with respect to the core member due to a shock occurred during the pressure application operation. Consequently, the core member is tended to be staked (or caulked) onto the housing in a state wherein the axial line of the core member is tilted with respect to the axial line of the core member attaching hole of the housing.

Hence, in the previously proposed electromagnetic valve, the core member is inserted into the core member attaching hole of the valve casing with the core member slightly tilted. Then, when the valve body is opened, the magnetic field formed between the tip end of the core member and the valve body and generated by the electromagnetic coil is disturbed so that the valve opening operation of the valve body becomes unstable and the lift variable (lift distance) of the valve body is varied from its predetermined constant value.

Although a method for forming screws on the core member and the core member attaching hole may be considered, it is necessary to perform screw forming operations for the small diameter portion of the core member and for the core member attaching hole using a screw forming die and to perform the screwing operation to spirally attach the core member to the core member attaching hole. This makes the manufacturing operation of the electromagnetic valve troublesome.

It is therefore an object of the present invention to provide an improved electromagnetic valve and a method for manufacturing the electromagnetic valve which can accurately position the core member to the housing, can carry out an efficient attaching operation of the core member onto the housing, can achieve stable opening and closing of the valve body, and can improve a reliability.

According to one aspect of the present invention, there is provided with an electromagnetic valve comprising: a valve casing having an approximately cylindrical space extended in an axial direction thereof; a fluid flow passage formed by the valve casing; a valve seat formed by the valve casing at a tip end of the cylindrical space in a midway through the fluid flow passage; a valve body disposed at the tip end of the cylindrical space so as to be coaxial to the cylindrical space and biased so as to be seated on the valve seat to close the fluid flow passage; an elongated plate extended in a radial direction of the cylindrical space of the valve casing so as to enclose a basic end of the cylindrical space opposite to the tip end thereof and having a core member attaching hole having a diameter shorter than that of the cylindrical space; a magnetic core member having a relatively large diameter portion located within the cylindrical space, a relatively small diameter portion inserted into the core member attaching hole of the elongated plate and whose outer diameter is approximately equal to an inner diameter of the core member attaching hole; and a whole peripherally caulked portion formed on a basic end of the relatively small diameter portion so as to caulk a whole periphery of the relatively small diameter portion onto the core member attaching hole at a position projected from the core member attaching hole of the plate; and an electromagnetic coil wound within an internal of the valve casing so as to be magnetically faced with the magnetic core member and so as to form a magnetic field together with the core member, the plate, and the valve body, the valve body being magnetically attracted to the relatively large diameter portion against a biasing force to open the fluid flow passage when a power is supplied to the electromagnetic coil.

According to another aspect of the present invention, there is provided with a method for manufacturing an electromagnetic valve comprising the steps of: providing a valve casing having an approximately cylindrical space extended in an axial direction thereof; providing a fluid flow passage formed by the valve casing; providing a valve seat formed by the valve casing at a tip end of the cylindrical space in a midway through the fluid flow passage; providing a valve body disposed at the tip end of the cylindrical space so as to be coaxial to the cylindrical space and biased so as to be seated on the valve seat to close the fluid flow passage; providing an elongated plate extended in a radial direction of the cylindrical space of the valve casing so as to enclose a basic end of the cylindrical space opposite to the tip end thereof and having a core member attaching hole having a diameter shorter than that of the cylindrical space; providing a magnetic core member having a relatively large diameter portion located within the cylindrical space, a relatively small diameter portion inserted into the core member attaching hole of the elongated plate and whose outer diameter is approximately equal to an inner diameter of the core member attaching hole; and a whole peripherally caulked portion formed on a basic end of the relatively small diameter portion so as to caulk a whole periphery of the relatively small diameter portion onto the core member attaching hole at a position projected from the core member attaching hole of the plate; and providing an electromagnetic coil wound within an internal of the valve casing so as to be magnetically faced with the magnetic core member and so as to form a magnetic field together with the core member, the plate, and the valve body, the valve body being magnetically attracted to the relatively large diameter portion against a biasing force to open the fluid flow passage when a power is supplied to the electromagnetic coil.

BEST MODE FOR CARRYING OUT THE INVENTION

Reference will hereinafter be made to the drawings in order to facilitate a better understanding of the present invention.

Figure 1:
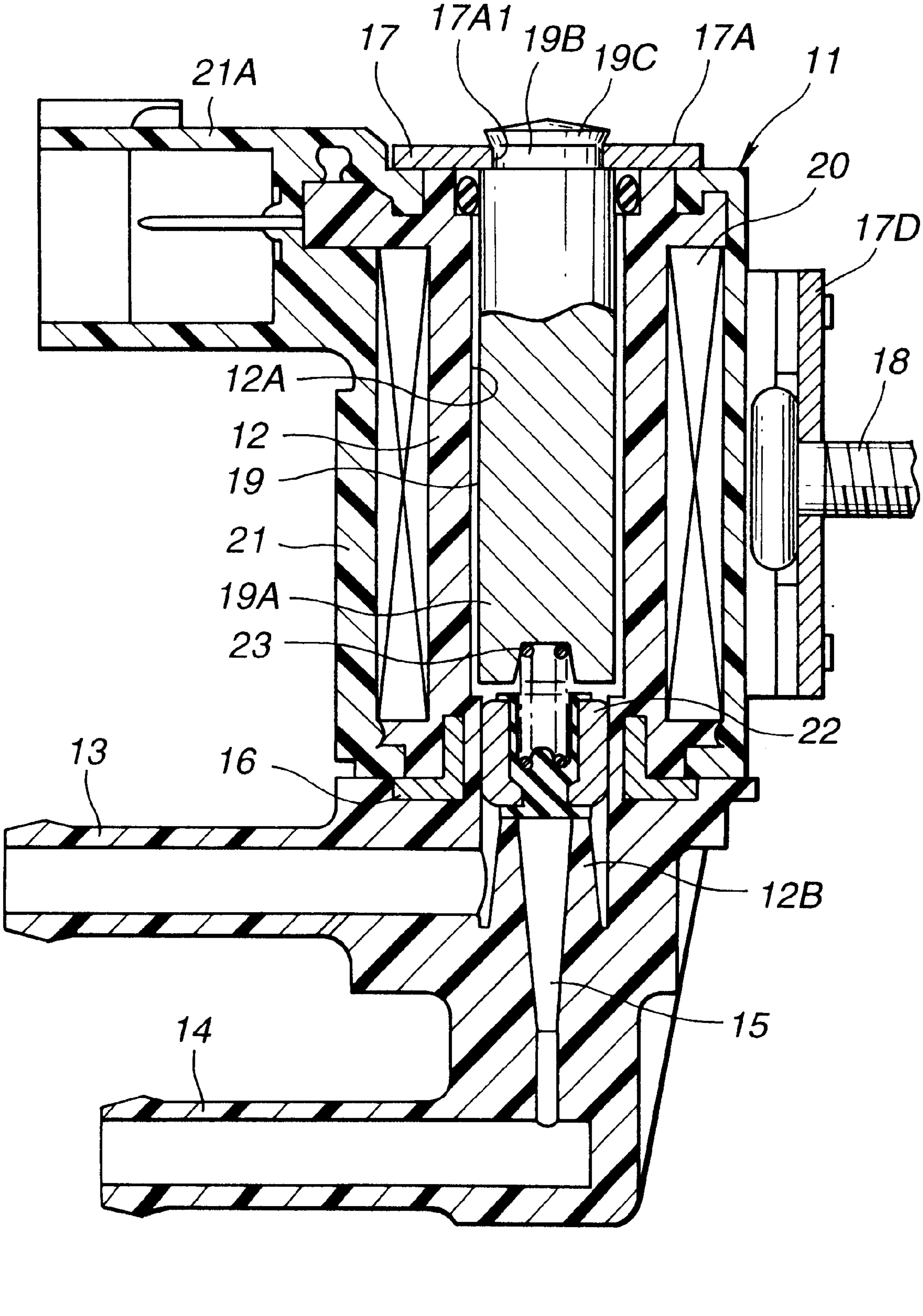
FIG. 1 is a longitudinally cross sectioned view of an electromagnetic valve in a preferred embodiment according to the present invention.

FIG. 1 shows a longitudinally cross sectioned view of an electromagnetic valve in a preferred embodiment according to the present invention.

Figure 2:
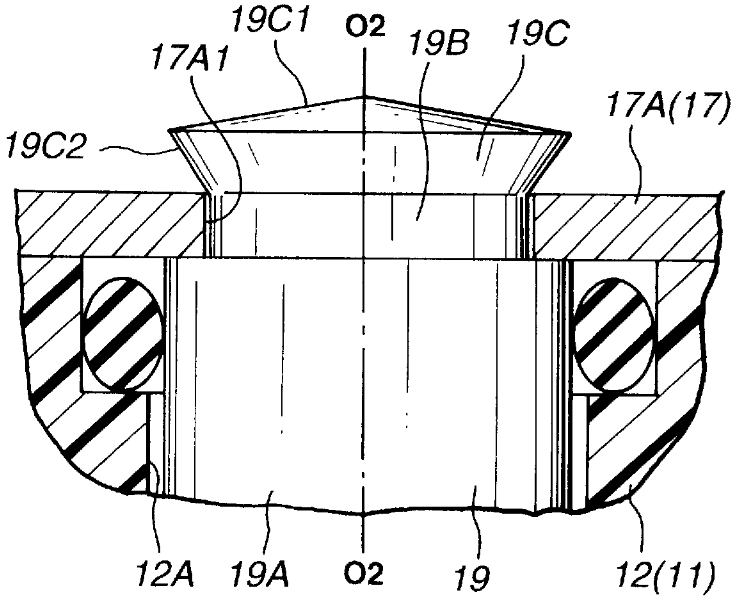
FIG. 2 is an essential part expanded view of the electromagnetic valve shown in FIG. 1 for explaining a positional relationship between a magnetic core member and a hollow housing.

FIG. 2 shows an essential part of the electromagnetic valve shown in FIG. 1 after the assembly of a magnetic core member onto a housing.

In FIG. 1, a hollow valve casing 11 is formed of a resin material. The hollow valve casing 11 includes: a casing main body 12 in a stepped cylindrical form; an inlet 13 integrally formed with the casing main body 12 and projected toward a radial direction of the casing main body 12 from the casing main body 12; an outlet 14 integrally formed with the casing main body 12 and projected toward the radial direction from the casing main body 12; and a coil covering 21 disposed so as to enclose an electromagnetic coil 20 (which will be described later).

A core member inserting hole 12A of an elongated rectangular cross section is formed in an axial direction of the valve casing main body 12 on a basic end (an upper end as viewed from FIG. 1) of the casing main body 12 into which a magnetic core member 19 (as will be described later) is inserted. An annular valve seat 12B is located at a tip end (a lower end as viewed from FIG. 1) of the core member inserting hole 12A. The valve seat 12B is coaxially disposed with the core member inserting hole 12A. The inlet 13 is communicated with an outer periphery of the valve seat 12B and the outlet 14 is communicated with an inner periphery of the valve seat 12B via an approximately truncated cone shaped throttling passage 15. Hence, a fluid flow passage for an evaporated fuel (gas) is formed about the valve seat 12B to communicate the fluid flow from the inlet 13 to the outlet via the throttling passage 15.

An approximately cylindrically shaped metallic plate 16 formed of a magnetic material is buried into an internal of the casing main body so as to enclose a valve body 22 (which will be described later). A pair of projections (not shown) protruded in a radial direction from the casing main body 12 are extended so as to be orthogonal to the inlet 13.

An approximately inverted letter-U shaped housing 17 made of a magnetic material such as an iron or magnetic stainless steel material includes: a core member attaching plate 17A disposed on a basic end of the valve casing 11; a pair of left and right side plate portions 17B and 17B and 17B and 17B extended axially along an outer periphery of the valve casing 11 from the core member attaching plate portion 17A; and two pairs of engagement pawls 17C and 17C and 17C and 17C as engagement portions extended on a tip end of the respective side plate portions 17B.

A magnetic core member attaching hole 17A1 onto which the core member 19 is to be attached is coaxially formed on the core member inserting hole 12A of the casing main body 12.

In addition, a flat attaching plate portion 17D is formed on the core member attaching plate portion 17A so as to be coaxial to the core member inserting hole 12A of the casing main body 12.

The flat plate portion 17D links the pair of spaced apart left and right side plate portions 17B, a bolt 18 being secured onto the attaching portion 17D so that each valve casing 11 is exposed and installed externally. Each engagement pawl 17C is engaged to a corresponding one of the protrusions of the metallic plate 16. Consequently, the housing 17 is linked to the valve casing 11.

A rod-shaped magnetic core member 19 is formed of the magnetic material such as the iron or the magnetic stainless steel material.

As shown in FIG. 1 or FIG. 2, the magnetic core member 19 includes: a relatively large diameter portion 19A inserted within the core member inserting hole 12A of the casing main body 12 and extended within the core member inserting hole 12A of the casing main body 12 along an axial line of 02—02; a relatively small diameter portion 19B integrally formed on the basic end of the relatively large diameter portion 19A and projected from the core member inserting hole 12A; and a wholly peripheral caulked portion 19C in an approximately truncated cone shape formed on the relatively small diameter portion 19B.

The core member 19 is coaxially disposed on the core member attaching hole 17A1 of the housing 17 and the core member inserting hole 12A of the valve casing 12. In this state, through the whole peripherally caulked portion 19C, the magnetic core member 19 is caulked to the core member attaching hole 17A1 over the whole periphery.

The relatively large diameter portion 19A is faced against the valve body 22 with its tip end at a predetermined interval so as to set a lift distance (lift variable) when the valve body 22 is open.

In addition, the relatively small diameter portion 19B is formed with its outer diameter dimension slightly smaller than the core member attaching hole 17A1 of the housing 17 and inserted within the core member attaching hole 17A1.

The whole peripherally caulked portion 19C is formed under a spinning caulking process against a projected end of the relatively small diameter portion 19B from the core member attaching hole 17A1. An outer peripheral end of the whole peripheral caulked portion is projected externally in the radial direction from the portion at which the core member 19 is attached onto the core member attaching hole 17A1. In addition, the whole periphery caulked portion 19C includes: a truncated cone shape surface portion 19C1 formed on an upper side surface of the relatively small diameter portion; and a taper surface portion 19C2 having a diameter expanded so that its lower end is wholly brought in close contact with an opening end of the core member attaching hole 17A1. An electromagnetic coil 20 is fitted onto an outer peripheral side of the valve casing main body 12.

As shown in FIG. 1, an outer peripheral side of the electromagnetic coil 20, an approximately cylindrical coil covering 21 having a connector 21A is secured onto an outer peripheral side of the electromagnetic coil 20. The electromagnetic coil 20 forms an electromagnetic field (closed magnetic path) together with the metallic plate 16, the housing 17, the magnetic core member 19, and the valve body 22. The valve body 22 is magnetically attracted into the core member 19 to open the valve body 22.

The valve body 22 is formed in an approximately cylindrical shape and is made of the magnetic material such as the iron and the magnetic stainless steel material.

The valve body 22 is located within the casing main body 12 and is interposed between the valve seat 12B and the core member 19 so as to be enabled to be seated on the valveseat 12B. A spring 23 is interposed between the valve body 22 and the core member 19 so as to always bias the valve seat toward the valve seat 12B.

Figure 3:
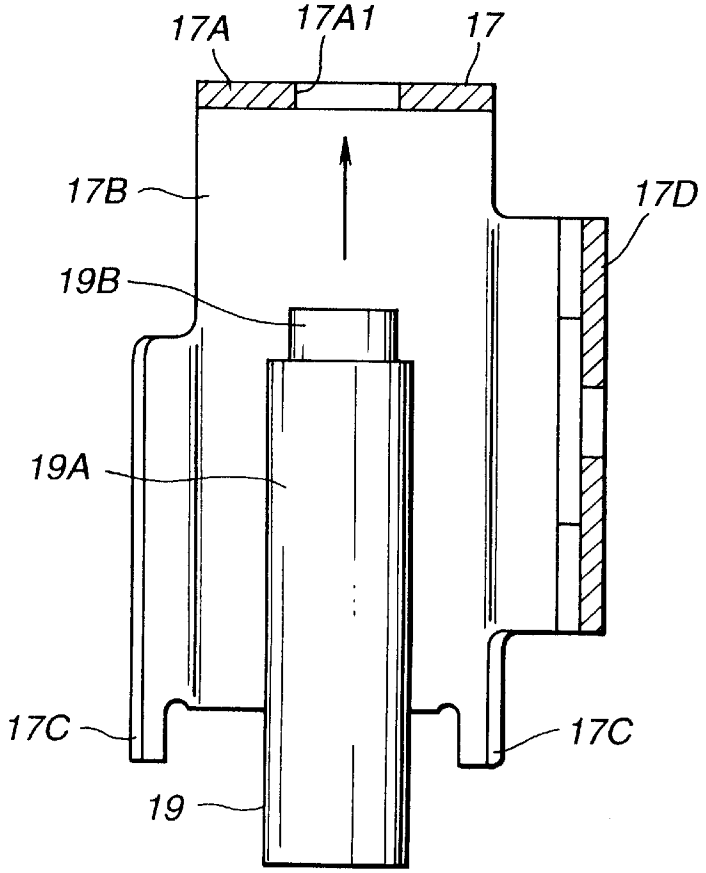
FIG. 3 is an essential part expanded view of the electromagnetic valve shown in FIG. 1 for explaining a state in which a relatively small diameter portion of the magnetic core member is inserted into a hole of the hollow housing.
Figure 4:
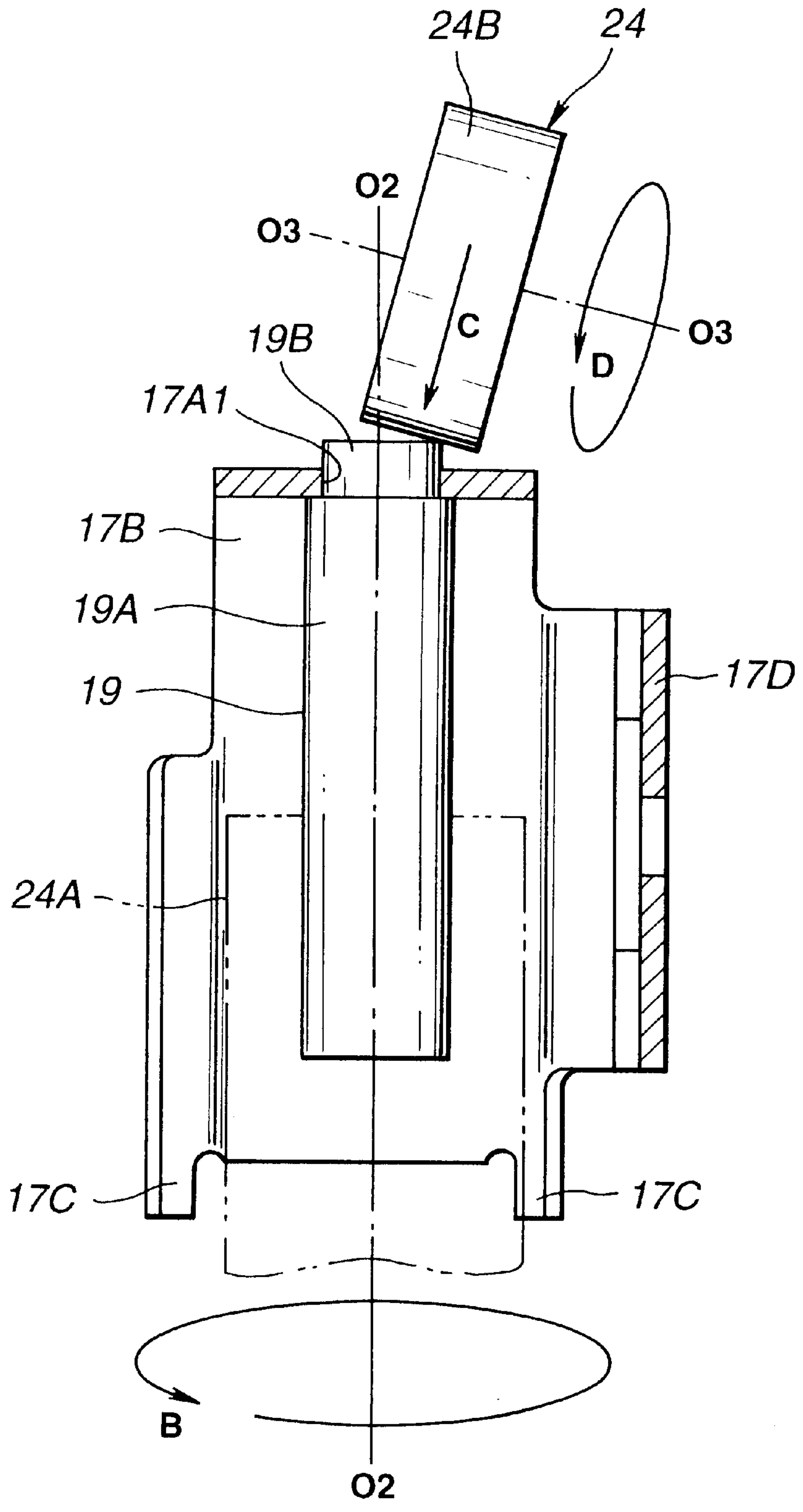
FIG. 4 is a longitudinally cross sectioned view representing a state in which both of the core member shown in FIG. 3 and the hollow housing are set in a spinning caulking device.
Figure 5:
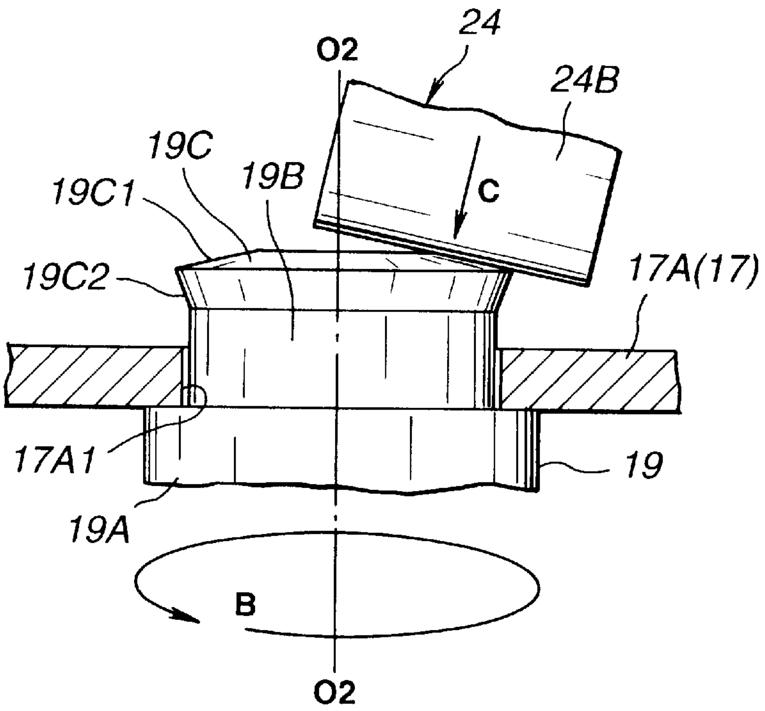
FIG. 5 is an essential part expanded view of the electromagnetic valve shown in FIG. 4 representing a state in which the relatively small diameter position is plastically deformed in a radial direction of the relatively small diameter portion by means of a roll of the spinning caulking device.

FIGS. 3 through 5 show the electromagnetic valve shown in FIG. 1 for particularly explaining an assembly process of the electromagnetic valve.

In details, when no power supply to the electromagnetic coil 20 occurs, the valve body 22 is seated on the valve seat 12B by means of a spring force of the spring 23 to hold a valve closed state and the inlet 13 is interrupted by the outlet 14.

On the other hand, when the core member 19 is attached onto the housing 17, with the relatively small diameter portion 19B of the magnetic core member 19 inserted within the core member attaching hole 17A1 in an arrow-marked direction as shown in FIG. 3 and with the upper end of the relatively small diameter portion 19B projected from the core member attaching hole 17A1, a spinning process caulking device 24 shown in FIG. 4 is used to treat a spinning caulking process over the projected end of the relatively small diameter portion 19B.

The spinning caulking device 24 used in the assembly of the electromagnetic valve includes: a clamp 24A for fixing the core member 19; a roll 24B, rotatably disposed with an axial line 03—03 as a center, so as to apply a pressure on the relatively small diameter portion 19B of the core member 19; and a rotation mechanism (not shown) for relatively rotating both of the clamp 24A and roll 24B in an arrow-marked direction B shown in FIG. 4 with an axial line 02—02 of the core member 19 as a center.

In the spinning caulking process, the relatively large diameter portion 19A of the core member 19 is attached onto the clamp 24A. When the core member 19 is positioned, the roll 24B is brought in contact with the projected end of the relatively small diameter portion 19B. In this state, the roll 24B is set such that the pressure application direction (an arrow-marked direction C shown in FIG. 4) to the relatively small diameter portion is tilted through a predetermined angle with respect to an axial line 02—02 of the core member 19.

Next, when the spinning process caulking device 24 is operated, the relatively small diameter portion 19B of the core member 19 is pressed in the arrow-marked direction C in FIG. 4 by means of the roll 24B and, at the same time, the roll 24B is revolved in the arrow-marked direction D. In this state, when the core member 19 is repeatedly revolved in the arrow-marked direction B, the spinning for the projected end of the relatively small diameter portion 19B is carried out.

Consequently, the basic end of the relatively small diameter portion 19B is plastically deformed to provide the truncated cone surface portion 19C1 due to a pressure application force of the roll 24B as shown in FIG. 5.

A lower surface portion of the truncated cone-shaped surface portion 19C1 is formed with a taper surface portion 19C2 whose outer peripheral side diameter is obliquely expanded in the radial direction. By repeating the pressure application by means of the roll 24B, the whole periphery of the core member attaching hole 17A1 of the housing 17 is equally expanded toward the core member attaching hole 17A1 of the housing 17 and its inclined angle is gradually increased.

Figure 6:
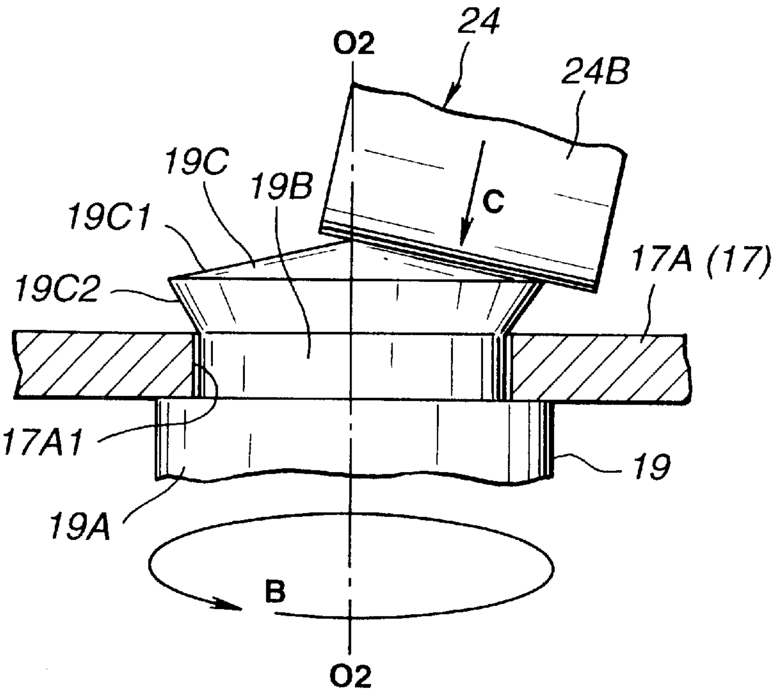
FIG. 6 is an essential part expanded view of the electromagnetic valve shown in FIG. 4 representing a state in which the relatively small diameter portion is furthermore plastically deformed in the radial direction of the relatively small diameter portion to form a whole peripherally caulked portion.

In this way, a lower end of the taper surface portion 19C2 is firmly contacted on the whole periphery of an opening end of the core member attaching hole 17A1 as shown in FIG. 6.

The core member 19 is whole peripherally caulked to the housing 17 by means of the caulked portion 19C. The axial line 02—02 is coaxially positioned to the core member attaching hole 17A1.

In addition, after the core member 19 is attached to the housing 17, the relatively large diameter portion 19A of the core member 19 is inserted within the core member inserting hole 12A of the valve casing 11.

Each side plate portion 17B of the housing 17 is disposed on the left and right sides of the valve casing 11. Each engagement pawl 17C of the housing is engaged to each protrusion of the metallic plate 16.

Since, in the preferred embodiment, the whole peripherally caulked portion 19C is formed by the spinning process against the core member 19 can easily be fixed to the housing 17 by only using the spinning caulked portion 19C, with the relatively small diameter portion 19B inserted into the core member attaching hole 17A1 of the housing 17.

Hence, these attaching operations can efficiently be advanced.

In this case, the spinning caulking process is carried out so that the taper surface portion 19C2 of the whole peripherally caulked portion 19C is gradually expanded so that the peripheral directions of the taper surface portion 19C2 become equally tapered. When the spinning caulking process is ended, the taper surface portion 19C2 is firmly contacted over the whole periphery over the core member attaching hole 17A1 of the housing 17.

Consequently, the core member 19 can be caulked to the housing 17 under the stable condition. Both the core member 19 and the core member attaching hole 17A1 of the housing 17 can coaxially and accurately be positioned to each other. A positional error such as the inclination of the core member 19 to the housing 17 or a possible fluctuation of the core member 19 due to a presence of a play in the caulked portion (or the core member attaching hole 17A1 of the housing 17) can be prevented from occurring.

Hence, in a state in which the housing 17 and the core member 19 are mounted on the valve casing 11, the relatively large diameter portion 19A of the core member 19 can coaxially and accurately be arranged within the core member inserting hole 12A of the casing main body 12.

Together with the valve open-and-close operations of the valve body 22 and lift distance be held under the stable condition, a reliability can be improved.

Since the housing 17 is wholly formed in the approximately inverted letter-U shape, including the core member attaching plate portion 17A, side plate portions 17B, and the engagement pawls 17C and 17C, the core member 19 can stably be attached onto the valve casing 11. In this state, the closed magnetic path to open the valve body 22 can smoothly be formed with the metallic plate 16, the housing 17, the core member 19, and the electromagnetic coil 20 and a valve open characteristic of the valve body 22 can be stabilized.

In the embodiment described above, the electromagnetic valve is applicable to an evaporated fuel purge system in a vehicular internal combustion engine as the purge control valve.

It is noted that the evaporated fuel purge system in the vehicular internal combustion engine is exemplified by a U.S. Pat. No. 5,767,395 issued on Jan. 16, 1998 (the disclosure of which is herein incorporated by reference).

The present invention is applicable to any arbitrary electromagnetic valve which opens or closes a flow passage of a fluid (liquid or gas).

It is noted that a cylindrical space defined in claims corresponds to the core member inserting hole 12A of the valve casing 12.

What is claimed is:

1. An electromagnetic valve comprising:

a valve casing having an approximately cylindrical space extended in an axial direction thereof;

a fluid flow passage formed by the valve casing;

a valve seat formed by the valve casing at a tip end of the cylindrical space in a midway through the fluid flow passage;

a valve body disposed at the tip end of the cylindrical space so as to be coaxial to the cylindrical space and biased so as to be seated on the valve seat to close the fluid flow passage;

an elongated plate extended in a radial direction of the cylindrical space of the valve casing so as to enclose a basic end of the cylindrical space opposite to the tip end thereof and having a core member attaching hole having a diameter shorter than that of the cylindrical space;

a magnetic core member having a relatively large diameter portion located within the cylindrical space, a relatively small diameter portion inserted into the core member attaching hole of the elongated plate and whose outer diameter is approximately equal to an inner diameter of the core member attaching hole; and a whole peripherally caulked portion formed on a basic end of the relatively small diameter portion so as to caulk a whole periphery of the relatively small diameter portion onto the core member attaching hole at a position projected from the core member attaching hole of the plate; and an electromagnetic coil wound within an internal of the valve casing so as to be magnetically faced with the magnetic core member and so as to form a magnetic field together with the core member, the plate, and the valve body, the valve body being magnetically attracted to the relatively large diameter portion against a biasing force to open the fluid flow passage when a power is supplied to the electromagnetic coil.

2. An electromagnetic valve as claimed in claim 1, wherein the whole peripherally caulked portion of the core member is formed in an approximately truncated cone shape on the basic end of the relatively small diameter portion.

3. An electromagnetic valve as claimed in claim 2, wherein the whole peripherally caulked portion of the core member is formed under a caulking treatment through a spinning process so that an outer peripheral end of the whole peripherally caulked portion is projected toward an outside in the radial direction of the cylindrical space of the valve casing.

4. An electromagnetic valve as claimed in claim 1, which further comprises a housing with which the elongated plate is integrally formed and a metallic plate in a letter L shape and located in a vicinity to the valve seat and installed within the valve casing so as to be faced magnetically with the valve body, the metallic plate being engaged to a tip end of the housing.

5. An electromagnetic valve as claimed in claim 4, wherein the housing is formed in an approximately inverted letter-U shape and includes: the elongated plate; a pair of side plate portions extended from the elongated plate in the axial direction of the cylindrical space; and an engaging portion disposed on tip ends of the pair of the side plate portions and engaged to the metallic plate.

6. An electromagnetic valve as claimed in claim 5, wherein a closed magnetic path is formed by the electromagnetic coil, the core member, the valve body, and the housing when the power is supplied to the electromagnetic coil.

7. An electromagnetic valve as claimed in claim 6, which further comprises a spring intervened between the tip end of the relatively large diameter portion of the core member and the valve body so as to bias the valve body to be seated on the valve seat and wherein the valve body includes another metallic plate portion having the approximately same diameter as the relatively large diameter portion of the core member and the valve body is attracted by a strength of the magnetic field to the tip end of the relatively large diameter portion of the core member against a spring force exerted by the spring when the power is supplied to the electromagnetic coil.

8. An electromagnetic valve as claimed in claim 7, wherein the valve casing further includes a first radially extended portion located below the metallic plate to form an inlet linked to the fluid flow passage and a second radially extended portion extended radially from the fluid flow passage to form an outlet is a purge gas of fuel.

9. An electromagnetic valve as claimed in claim 8, wherein an axial direction of the core member is in line with that of the valve body and is orthogonal to an elongated direction of the elongated plate of the housing.

10. A method for manufacturing an electromagnetic valve comprising the steps of:

providing a valve casing having an approximately cylindrical space extended in an axial direction thereof;

providing a fluid flow passage formed by the valve casing;

providing a valve seat formed by the valve casing at a tip end of the cylindrical space in a midway through the fluid flow passage;

providing a valve body disposed at the tip end of the cylindrical space so as to be coaxial to the cylindrical space and biased so as to be seated on the valve seat to close the fluid flow passage;

providing an elongated plate extended in a radial direction of the cylindrical space of the valve casing so as to enclose a basic end of the cylindrical space opposite to the tip end thereof and having a core member attaching hole having a diameter shorter than that of the cylindrical space;

providing a magnetic core member having a relatively large diameter portion located within the cylindrical space, a relatively small diameter portion inserted into the core member attaching hole of the elongated plate and whose outer diameter is approximately equal to an inner diameter of the core member attaching hole; and a whole peripherally caulked portion formed on a basic end of the relatively small diameter portion so as to caulk a whole periphery of the relatively small diameter portion onto the core member attaching hole at a position projected from the core member attaching hole of the plate; and providing an electromagnetic coil wound within an internal of the valve casing so as to be magnetically faced with the magnetic core member and so as to form a magnetic field together with the core member, the plate, and the valve body, the valve body being magnetically attracted to the relatively large diameter portion against a biasing force to open the fluid flow passage when a power is supplied to the electromagnetic coil.

11. A method for manufacturing an electromagnetic valve as claimed in claim 10, wherein the whole peripherally caulked portion is formed by applying a pressure onto the relatively small diameter portion at a constant inclined angle with respect to the axial direction of the core member by means of a roll used for a spinning process and rotating the core member about the axial direction of the core member to plastically deform the basis end of the relatively small diameter portion to provide the whole peripherally caulked portion in an approximately truncated cone shape.

* * * * *